United States Patent

[72] Inventor Reginald K. Ringel
    Decatur, Ill.
[21] Appl. No. 824,979
[22] Filed May 15, 1969
[45] Patented Aug. 3, 1971
[73] Assignee Caterpillar Tractor Co.
    Peoria, Ill.

[54] MULTIPART BEARING LINER
    7 Claims, 4 Drawing Figs.
[52] U.S. Cl. .................................................. 308/72
[51] Int. Cl. ............................................. F16c 11/06
[50] Field of Search ...................................... 308/72;
                                            287/88, 87, 90 C, 90 A

[56] References Cited
    UNITED STATES PATENTS
    489,505  1/1893  Silvey .......................... 308/72

[11] 3,597,025

1,554,757  9/1925  Pope et al. ..................... 308/244
1,807,373  5/1931  Blunt ............................ 308/72
2,985,494  5/1961  Tarhorst ........................ 308/74
3,217,388  11/1965 White ............................ 308/72

Primary Examiner—Martin P. Schwadron
Assistant Examiner—Frank Susko
Attorney—Fryer, Tjensvold, Feix, Phillips & Lempio ABSTRACT: A bearing assembly comprises a multipart, semirigid bearing liner having a tang formed on at least one of the parts thereof. A recess, formed in the bearing assembly, mounts the tang therein to mechanically anchor the liner in position. In one illustrated embodiment, the recess is formed in a socket member of the bearing assembly whereas in a second embodiment the tang and recess are formed on adjacent parts of the bearing liner.

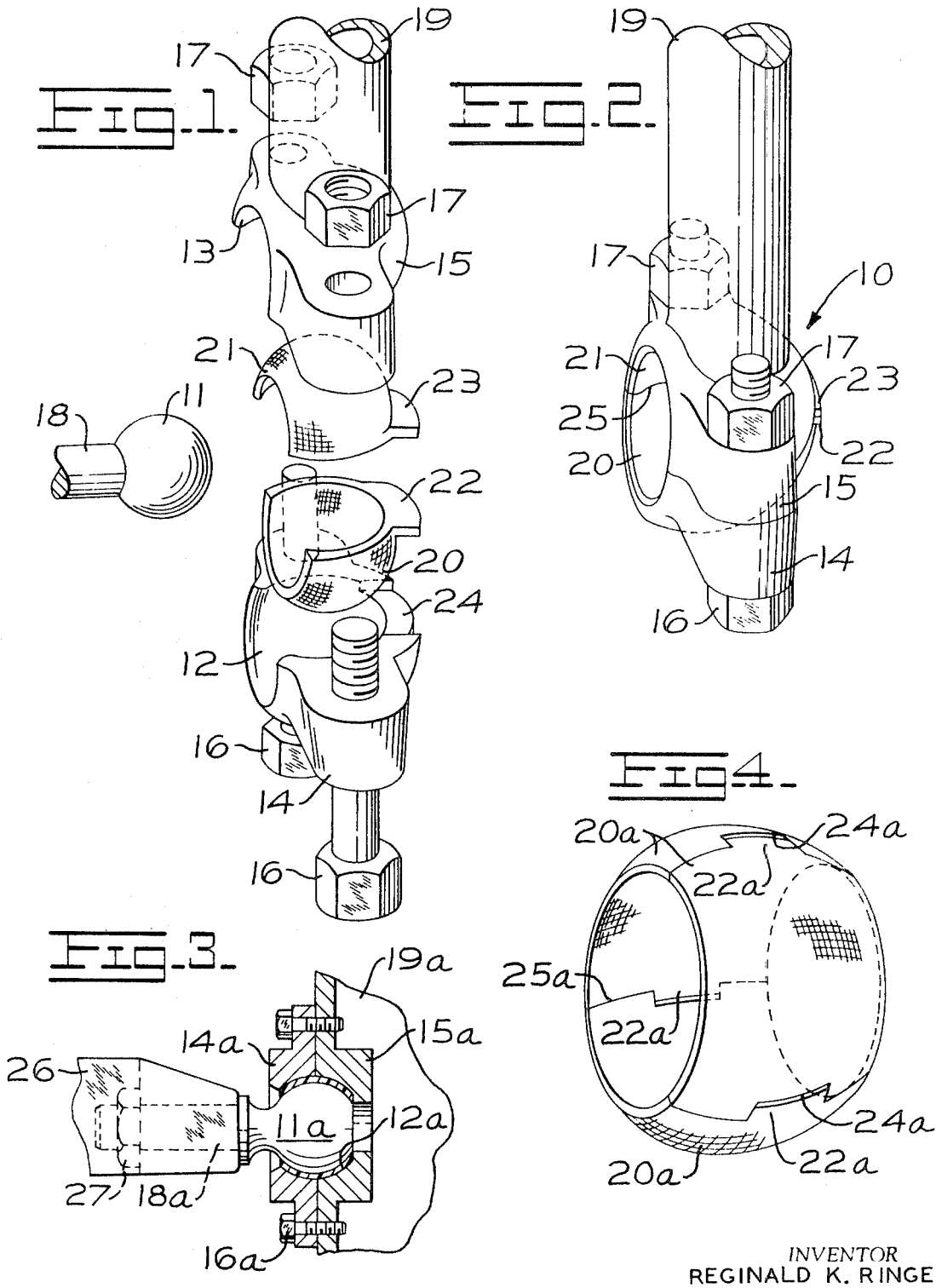

MULTIPART BEARING LINER

The advent of self-lubricating bearing assemblies has dictated the need for positively retaining the liner thereof in position during operation. Movement of such liner tends to substantially reduce its life expectancy and ability to continuously assure an efficient bearing contact. Replacement of such liner oftentimes proves costly since the required "downtime" of the repaired vehicle, such as a motor grader, may be prolonged.

An object of this invention is to overcome the above, briefly described problems by providing a multipart, semirigid bearing liner comprising tang means formed on at least one part thereof for mechanically anchoring such part in position in a bearing assembly. The bearing liner may be economically fabricated by conventional methods and expeditiously assembled into a bearing assembly. The retaining and indexing desiderata afforded by such tang means assures that the bearing liner will function efficiently over a substantially long period of time.

Other objects of this invention will become apparent from the following description and accompanying drawings wherein:

FIG. 1 is an exploded, isometric view of a bearing assembly;

FIG. 2 is a view similar to FIG. 1, but shows the bearing assembly in its assembled condition;

FIG. 3 is a partially sectioned, side elevational view of a modified bearing assembly; and FIG. 4 is an enlarged, isometric view of a bearing liner employed in the FIG. 3 assembly.

FIGS. 1 and 2 illustrate a bearing assembly embodiment 10 in the form of a ball joint. The assembly comprises a semispherical ball journal 11 mounted in complementing socket portions 12 and 13. Such socket portions are suitably formed in socket members 14 and 15, respectively, to form a smooth and continuous semispherical socket. Bolts 16 and nuts 17 may be utilized to structurally integrate the bearing assembly into the single unit illustrated in FIG. 2.

Connecting rods 18 and 19, secured to ball journal 11 and socket member 15, respectively, may be suitably integrated into a desired type of mechanical linkage. For example, the bearing assembly and connecting rods may form part of the mechanical linkage utilized to support and control movements of an earth-working blade (not shown) or scarifier (not shown) employed in a conventional motor grader. It should be apparent that the bearing assembly may find a large number of other similar-type uses.

This invention is essentially drawn to the application of a multipart and semirigid bearing liner, preferably comprising identical and superimposed parts 20 and 21, respectively, in the bearing assembly. Each semirigid part preferably exhibits a substantially constant thickness throughout and is preformed by suitable molding techniques to assume a spherical shape conforming to the socket 12,13. Tang means or lugs 22 and 23 are preferably formed as an integral part of the molded liner parts to extend radially outwardly therefrom, as shown.

Upon assembly, tang 22 mounts in recess or slot 24 formed in socket member 14 to index the liner part into correct position. A like recess (not shown) is formed on socket member 15 to receive tang 23 which abuts tang 22 in superimposed relationship. The tangs and mating recesses thus not only assure proper alignment of the liner in the bearing assembly but are clamped between the socket members to also prevent the liner from moving during operation. The flush, mating surface portions of the liner parts exhibit a line contact 25 (FIG. 2) to provide a smooth and uninterrupted semispherical, antifrictional bearing cavity therein which conforms with the outer surface portions of polished steel ball journal 11.

The modified form of this invention, illustrated in FIGS. 3 and 4, comprises a semispherical ball journal 11a mounted in socket members 14a, 15a by three identical liner parts 20a. Bolts 16a may be utilized to structurally integrate the assembly into a single unit whereas a stem 18a, secured to the ball journal, may be suitably attached by a nut 27 to element 26. Socket member 15a may be secured to or formed as an integral part of a frame 19a of a vehicle, for example.

FIG. 4 illustrates the preformed bearing liner as comprising three identical parts each of which has a tang means 22a and a recess 24a formed on opposite edges thereof. The three parts are pressed and interlocked together to exhibit line contacts 25a at the abutting edge portions thereof. Thus, the liner will assume a substantially constant thickness throughout and will form a semispherical, antifrictional bearing cavity therein conforming to ball journal 11a.

The above-described bearing liners are preferably preformed by conventional molding techniques to be preset in their semirigid form. The liner may comprise, for example, a woven fabric at least partially impregnated with a thermosetting or thermoplastic resin. The fabric's fibers may be at least substantially composed of a tetrafluoroethylene (Teflon), polyethylene, polyamide (Nylon), monochlorotrifluoroethylene or polymeric fluorocarbon resin, or a suitable combination thereof.

Tetrafluoroethylene resins (Teflon) have been found particularly useful for such liners since the inherent lubricity thereof is quite high. In addition, such resins are capable of withstanding temperatures in the range of 600° F. and when formed as a fiber will exhibit a very high tensile strength. In certain applications it has been found advantageous to weave such fibers with fibers of glass, cotton, wool or fibers composed of one of the aforementioned other resins. In the event of such a compound weave, it has been found desirable to arrange the tetrafluoroethylene fibers so that they are exposed over substantially all of the bearing surface area of the liner.

The chosen fabric is preferably at least partially preimpregnated or backed with a thermosetting resin or elastomeric material such as natural or synthetic rubber to insure that the formed liner will be semirigid to facilitate its installation. Examples of such resins are phenol formaldehyde, urea-formaldehyde and the polyester resins. The latter, impregnating resins may also be used to adhesively secure the liner to socket 12,13 although the tang means would normally prove adequate for mechanically anchoring the liner in position in most bearing applications.

As suggested above, the liner may be molded into shape by techniques and methods well known in the art. One method contemplates cold shaping a chosen cloth into the shape of liner part 20 and tang 22, for example, in a suitable die set. The outside of the liner may then be coated or backed with a selected, impregnating resin. Suitable application of heat and pressure to such combination and subsequent colling thereof will function to mechanically bond the two constituents together to set and form a semirigid liner. Although the liner is preferably fully formed prior to installation in the bearing assembly, it may be "post-set" therein by the suitable application of heat.

The resulting, smooth antifrictional bearing surfaces formed internally of the liner will assure a long life expectancy for the bearing assembly. Although the bearing liners find particular application in the illustrated ball joints, it should be understood that the described tang means-recess feature is adapted for other bearing or bushing applications. For example, such feature could be utilized for multipart liners employed in thrust- or sleeve-type bearings.

What I claim is:

1. A bearing assembly comprising a socket member forming a semispherical socket therein, a multipart, semirigid bearing liner positioned in said socket and forming an antifrictional bearing cavity therein, tang means secured to at least one part of said liner, means mechanically attaching said tang means to said socket member and a ball journal mounted in said bearing cavity and having a connecting rod attached thereto positioned diametrically opposite to said tang means on said bearing assembly.

2. The invention of claim 1 wherein said means mechanically attaching said tang means to said socket member comprises means forming a recess in said socket member, said tang means mounted in said recess for indexing said one part into position and for preventing said one part from moving relative to said socket member.

3. The invention of claim 2 wherein said bearing liner has a semispherical shape and constitutes two superimposed parts with a tang means formed on each of said parts to extend radially outwardly from said bearing liner.

4. The invention of claim 3 wherein said tang means are disposed to abut each other in superimposed relationship.

5. The invention of claim 1 wherein said bearing liner is molded and comprises a woven, low-friction cloth at least partially impregnated with a heat-settable resin.

6. The invention of claim 5 wherein said cloth is at least substantially composed of tetrafluoroethylene resin fibers.

7. The invention of claim 1 wherein said tang means is formed as an integral part of said one part.